Patented May 12, 1931

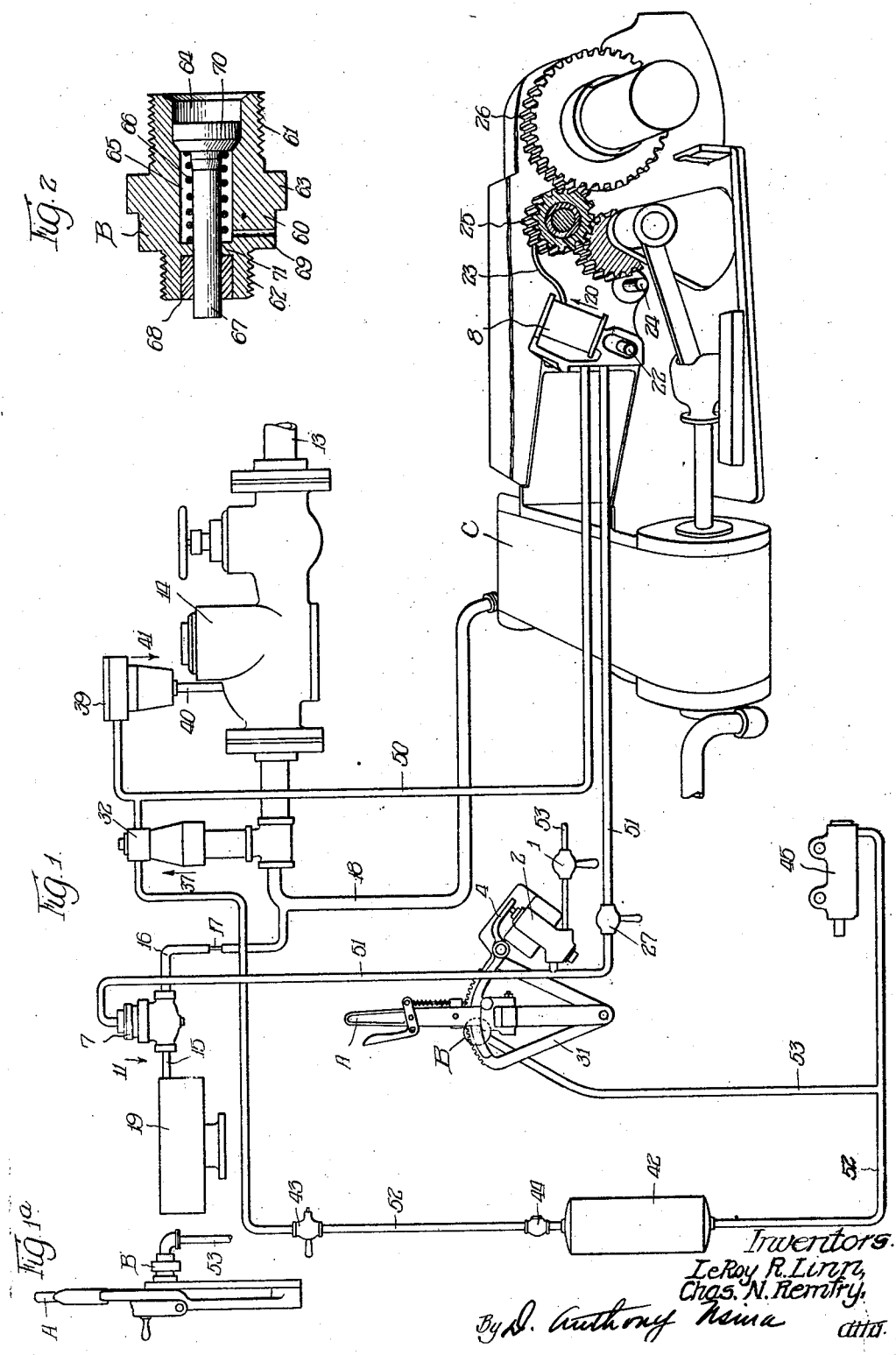

1,804,881

UNITED STATES PATENT OFFICE

LE ROY R. LINN AND CHARLES N. REMFRY, OF PROCTOR, MINNESOTA

SAFETY DEVICE FOR LOCOMOTIVE BOOSTERS

Application filed April 9, 1927. Serial No. 182,341.

The invention relates to a locomotive, and more particularly to locking means which in the adaptation of the device illustrated takes the form of mechanism which is to be used for preventing reversing of the locomotive until all the steam is exhausted from the booster cylinder.

Generally, locomotives equipped with boosters have no means, either pneumatic or otherwise, for preventing reversing of the locomotive while the booster is in operation or while there is still steam in the booster cylinders, and it has been frequently found necessary to repair the trailer wheels, gears or clutch cylinder rocker arms due to reversing the locomotive while the booster is still in forward operation.

It is, therefore, an object of this invention to provide a locking means for a locomotive as particularly applied to the reverse lever quadrant for preventing reversing of the locomotive while the booster is still in operation or steam is still in the booster cylinders.

Another object is to provide a simple locking means for preventing reversing of the locomotive until a given time.

Another object is to provide an inexpensive pressure lock which is automatic in operation and inexpensive to construct and maintain and which is applied to the fluid pressure line of the locomotive for preventing reversing of the locomotive while the booster is still in operation.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a diagrammatic showing of the booster layout and such piping as is necessary to show the operation of the booster and the application of the invention;

Figure 1a is a side elevation of the reverse lever showing the connection of the air lock to the lever quadrant; and Figure 2 is a sectional elevation of the booster lock which is the subject-matter of this invention.

In general, A is the reverse lever shown with the booster reverse lever lock B, applied to the quadrant in way of the lever, which lock prevents reversing of the locomotive while steam remains in the cylinders of the booster C in a manner and by the means to be more particularly described. Referring particularly to Figure 1, 1 is a booster air line valve which controls the air from the main reservoir, connected to said valve through the pipe line 53, said line being connected to the reverse lever pilot valve 2 controlled by the latch lever 4, which may be a bellcrank actuated by the reverse lever A, the valve 1 serving as means whereby the system is operated. The pilot valve 2 is disposed in the pipe line 51 which connects the clutch cylinder 8 and the preliminary throttle valve 7, the clutch cylinder being control means whereby the booster is rendered operative. The preliminary throttle valve is connected to the steam turret 19 by means of pipe 15, said valve forming a connection between the pipe 15 and pipe 16 which leads through the choke 17 to the booster steam inlet pipe 18 which is directly connected to the booster and is also connected to the booster throttle valve 14 through the dome pilot valve 32. Throttle operating valve 39 is provided for the throttle valve 14, piston rod 40 of the valve 39 providing a control for the throttle valve. The valve 39 is connected to the dome pilot valve 32 through the pipe 50 which also leads to the clutch cylinder 8. Pipe line 52 leads from the dome pilot valve 32 through a cylinder cut-out cock 43 and a one-way check valve 44 to a timing reservoir 42 and from said reservoir to the cylinder cock operating cylinder 45. In said pipe line and between the timing reservoir and the operating cylinder 45, there is disposed a pipe line 53 leading to the booster reverse lever lock B which is applied to the quadrant 31.

In the booster, 8 represents the usual clutch cylinder which through a proper loose connection between the piston and a pin 22 on the idler gear rocker 23, operates to cause engagement between the idler gear 25 and the axle gear 26 by rocking the rocker 23 around its pivot 24. It will be seen then that when the idler 25 is in engagement with the axle gear 26, that the piston is then in condition for operation of the locomotive.

Figure 2 is a detail of the booster reverse lever lock in locking position, in which 60 represents the lock housing which is tapped or screw-threaded at 61 and 62 for connection to the air pipe 53 and the quadrant 31 respectively. Said housing is formed with a chamber 64 in which a piston 70 is adapted to oscillate. Connected to the chamber 64 is a chamber 65 preferably of smaller bore but concentric with the chamber 64. The housing may be conveniently formed with shoulders 63 for application of a wrench or other tool for applying the device to the quadrant or air line. A plunger 67 is provided which is attached to and associated with piston 70 and which provides the locking means. Disposed in the chamber 65 around the plunger 67 and between the piston 70 and one end 71 of the chamber 65 is a spring 66 for actuation of the piston to unlocked position on release of pressure in line 53. Bleeder 69 is provided connecting the chamber 65 to the atmosphere to exhaust any air in said chamber when the piston 70 is depressed. At the plunger end, it has been found preferable to provide a hardened steel bushing 68 in way of a locking end of the plunger to form a reinforcing for the quadrant end of the lock and also to provide an alignment means for the plunger oscillating in said end.

Briefly, the sequence of operation of the booster and its attendant system is as follows: When the cut-out cock 1 (piston air line valve) fitted into pipe 53 leading from the main air reservoir to the reverse lever pilot valve 2, is placed in open position, air is allowed to pass from the main air reservoir to the valve 2. The reverse lever pilot valve is depressed by means of the booster latch lever 4 thereby immediately admitting air through pipe 51 to the preliminary throttle valve 7 and to the clutch cylinder 8. The air passing into the top of the preliminary throttle valve causes the piston of said valve to move in the direction of the arrow 11, thereby opening the pipe line 15 from the steam turret 19 to the pipe 16 and allowing steam to pass through the choke 17 into the main booster steam inlet pipe 18. Thus it will be seen that a small quantity of steam controlled by the size of the choke 17 is admitted to the booster engine cylinders and will act to turn the booster engine very slowly.

At the same time that the foregoing is taking place, air is passing through the pipe 51 into the clutch cylinder 8, which allows a considerable building up of the air pressure in a chamber of said cylinder, causing the clutch cylinder to move in the direction of the arrow 20, compressing a suitable spring of the cylinder. This by means of the pin 22 causes the idler gear rocker 23 to fulcrum on the pin 24 so that the idler gear 25 meshes with the axle gear 26. The purpose of the cut-out cock 27 (idling valve) in the pipe 51 leading from the reverse lever pilot valve to the clutch cylinder is so that air can be cut out from the clutch cylinder but at the same time air can be admitted to the preliminary throttle valve, thus providing means of testing the booster engine without engaging the gears, i. e. means is provided for controlling operation of the clutch cylinder.

When the clutch cylinder has completed its movement, a suitable port thereon is opened to the air pressure built up in said cylinder. This air will pass into pipe 50 but it will be noticed that until the clutch cylinder has completed its movement, which means that the idler gear is fully in mesh with the axle gear, no air is allowed to pass out of the pipe 50. Through pipe 50, air passes to the dome pilot valve 32 into a suitable chamber in the top of said valve where it is trapped. Air also enters the throttle operating cylinder 39 where it tends to move the piston and its attendant piston rod 40 in the direction of the arrow 41, thus opening the main throttle valve in the booster throttle valve 14, allowing full steam pressure when said valve is open to be admitted from the locomotive steam chest to the booster inlet pipe 18. The main steam pressure moves the piston in the dome pilot valve in the direction of the arrow 37.

When this piston has completed its movement in the direction of the arrow 37, it opens the valve where air from the pipe 50 has been trapped, shuts off the vent to the atmosphere, and opens the air passage to pipe line 52. Through pipe line 52 air passes through the three-way cock 43 (cylinder cut-out cock) and thence to the check valve 44. The purpose of the three-way cock 43 is to permit of manual release of the cylinder cocks at any time during the booster operation. From the check valve 44, the air passes into a timing reservoir and thence to the cylinder cock operating cylinders 45, closing the cylinder cocks after a lapse of a suitable time interval. In the pipe line 52, preferably between the timing reservoir and the cylinder cock operating cylinder, there is disposed a trunk pipe line 53 to which an automatic safety lock may be attached; so it will be seen that as soon as the air pressure builds up sufficiently in the pipe line 52 to overcome the spring 66 in the air lock, the locking plunger 67 will be disposed in way of the reverse lever A to prevent reversing of the locomotive until the air in pipe 53 is exhausted.

The cutting-out operation is as follows: As the reverse lever is moved toward the center of the quadrant, the booster latch lever 4 is released, thus permitting the suitable valve in valve 2 to close, thereby stopping main reservoir air flow to pipe 51 and opening a suitable valve in valve 2 for releasing the air pressure from the pipe 51. By releasing the air from pipe 51, the spring under the valve in the preliminary throttle valve closes communication from the steam turret to the booster cylinders. The release of air from pipe 51 also permits air to escape from the chamber and the pipe of the valve 8 which permits the spring in said valve to move the rocker 23, disengaging gear 25 from gear 26 as soon as the contact pressure between gears 25 and 26 has decreased sufficiently to be overcome by the pressure from spring in valve 8. While the air is being released from pipe 51, it is also being released from pipe 50. A suitable spring in the dome pilot valve 32 moves its valve upward, releasing air from the pipe 52, the timing reservoir, the cylinder cock operating cylinder 45 and the automatic safety lock B. Upon release of the air from the cylinder cock operating cylinder, the cylinder cocks are opened to permit the steam in the booster cylinders to escape to the atmosphere. This release of steam will now permit the spring in the valve 8 to disengage the gear 25 from the gear 26. It will be noticed that there is considerable lapse of time from the time that the reverse lever pilot valve has opened pipe 51 to the atmosphere before the booster cylinder cocks will open, and should the locomotive be reversed before the booster cylinder steam be exhausted, serious damage could result in slid wheels, or broken gears or rocker arms in the booster as the booster would still be working forward while the locomotive is in reverse, but it will be seen that with the automatic safety lock provided, the air pressure holds out the locking plunger 67 in way of the reverse lever A until such time when no pressure exists in pipe line 52. Then the spring 66 will return the plunger into inoperative position, and then and not until then is it possible to move the reverse lever A to reverse position. It will, therefore, be seen that this device positively gives the assurance that all steam pressure is exhausted from the booster engine before the reverse lever can be placed in reverse position.

It is to be understood that the form of the device shown and its application to the booster and train line layout shown is merely by way of illustration and not limitation, as many forms and applications of said device may be used without departing from the scope of the inventive thought and the appended claims.

We claim:

1. In a device of the character described, the combination of a reversing lever, a booster, and means associated with said lever for preventing operation thereof to reverse position until steam pressure has been exhausted from the booster cylinder.

2. In a device of the character described, the combination of a reversing lever, lever lock means in the air line for preventing reversing of said lever, said means having an air chamber for connection to a fluid pressure line, and a piston in said chamber adapted to be acted on by said fluid pressure to thereby lock the reversing lever in the manner set forth.

3. In a device of the character described, the combination of a reversing lever, lever lock means in the air line for preventing reversing of said lever, said means having an air chamber for connection to a fluid pressure line, and a piston in said chamber adapted to be acted on by said fluid pressure to thereby lock the reversing lever to thereby prevent operation of the reversing lever to reverse position.

4. In a device of the character described, the combination of a reversing lever, lever lock means in an air line for preventing the reversing of said lever, said means having an air chamber for connection to a fluid pressure line, a piston in said chamber adapted to be acted on by said fluid pressure, and a plunger on said piston for preventing reversing of said lever until pressure is exhausted from the piston chamber.

5. In a device of the character described, the combination of a reversing lever, means in the air line for preventing the reversing of said lever, said means having an air chamber for connection to a fluid pressure line, a piston in said chamber adapted to be acted on by said fluid pressure, and a plunger on said piston adapted to be used for locking said lever out of reversing position.

6. In a device of the character described, the combination of a reversing lever, means in an air line for preventing the reversing of said lever, said means having an air chamber for connection to a fluid pressure line, a piston in said chamber adapted to be acted on by said fluid pressure, a plunger on said piston for preventing reversing of said lever until pressure is exhausted from the piston chamber, and means associated with said piston for returning said plunger to unlocked position.

7. In a device of the character described, the combination of a reversing lever, means in the air line for preventing the reversing of said lever, said means having an air chamber for connection to a fluid pressure line, a piston in said chamber adapted to be acted on by said fluid pressure, a plunger on said piston adapted to be used for locking said lever out of reversing position, and means associated with said piston for returning said plunger to unlocked position.

8. In a device of the character described, the combination of a booster, reversing mechanism, and pneumatically operated means associated with said mechanism preventing reversing thereof until and unless said booster has been rendered inoperative.

9. In a device of the character described, the combination of a locomotive booster, a fluid line to said booster for operation thereof, reverse mechanism for the locomotive, a fluid lock for said reverse mechanism, a fluid line to said lock, and means associated with said fluid lines whereby said lock may be actuated to prevent operation of said mechanism to reverse the locomotive until and unless fluid pressure has been relieved from said booster.

10. In a device of the character described, the combination of a locomotive booster, booster control means, locomotive reverse mechanism, means for rendering said reverse mechanism inoperative until and unless said control means has rendered said booster inoperative, fluid pressure lines connecting said before mentioned means, and means associated with said lines whereby said before mentioned means may be operated.

11. In a device of the character described, the combination of a locomotive booster, a fluid supply line to said booster for operation thereof, booster control means, locomotive reverse mechanism, means for rendering said reverse mechanism inoperative until and unless said control means has rendered said booster inoperative, fluid pressure lines connecting said before mentioned means, and means associated with said fluid lines for controlling operation of said before mentioned means, and means in one of said lines whereby said first mentioned means may be operated.

12. In a device of the character described, the combination of a locomotive booster, a fluid supply line to said booster for operation thereof, booster control means, locomotive reverse mechanism, means for rendering said reverse mechanism inoperative until and unless said control means has rendered said booster inoperative, fluid pressure lines connecting said before mentioned means, means associated with said fluid lines for controlling operation of said control means and second named means, and means in said second named line whereby said control means and second named means may be operated.

Signed at Proctor, Minnesota, this 6th day of April, 1927.

LE ROY R. LINN.
CHARLES N. REMFRY.